(12) United States Patent
Wilhelm

(10) Patent No.: US 8,791,383 B2
(45) Date of Patent: Jul. 29, 2014

(54) METHOD FOR ARC-WELDING WITH ALTERNATING CURRENT

(75) Inventor: Gerald Wilhelm, Unterschleibheim (DE)

(73) Assignee: PanGas, Dagmersellen (CH)

( * ) Notice: Subject to any disclaimer, the term of this patent is extended or adjusted under 35 U.S.C. 154(b) by 1364 days.

(21) Appl. No.: 12/069,210

(22) Filed: Feb. 8, 2008

(65) Prior Publication Data

US 2008/0223829 A1 Sep. 18, 2008

(30) Foreign Application Priority Data

Feb. 13, 2007 (DE) .......................... 10 2007 007 098
Mar. 20, 2007 (EP) ...................................... 07005696

(51) Int. Cl.
*B23K 9/00* (2006.01)
*B23K 35/38* (2006.01)
*B23K 9/09* (2006.01)
*B23K 9/10* (2006.01)
*B23K 9/12* (2006.01)

(52) U.S. Cl.
USPC ................... 219/74; 219/137 PS; 219/130.51

(58) Field of Classification Search
USPC .......... 219/74, 137 PS, 137 R, 130.51, 130.5, 219/130.33, 137.71
See application file for complete search history.

(56) References Cited

U.S. PATENT DOCUMENTS

| 4,877,941 | A  | * | 10/1989 | Honma et al. ........... 219/130.21 |
| 6,376,802 | B1 | * | 4/2002  | Tong et al. .............. 219/137 PS |
| 2002/0030043 | A1 | * | 3/2002  | Tong ........................ 219/137 PS |
| 2004/0245230 | A1 | * | 12/2004 | Huismann et al. ......... 219/137.7 |
| 2005/0284854 | A1 | * | 12/2005 | Tong et al. ............... 219/130.51 |
| 2006/0151440 | A1 | * | 7/2006  | Helgee et al. ................... 219/74 |
| 2006/0243704 | A1 | * | 11/2006 | Matz et al. ...................... 219/74 |
| 2007/0246448 | A1 | * | 10/2007 | Nishisaka et al. ........ 219/130.51 |
| 2008/0230528 | A1 | * | 9/2008  | Wilhelm ................... 219/137 R |

FOREIGN PATENT DOCUMENTS

| EP | 1 707 296 | 10/2006 |
| EP | 1707296 A1 * | 10/2006 |
| EP | 1972406 A1 * | 9/2008 |
| WO | WO 2006/089322 | 8/2006 |
| WO | WO 2006089322 A1 * | 8/2006 ............... B23K 9/09 |

* cited by examiner

*Primary Examiner* — Henry Yuen
*Assistant Examiner* — Hemant Mathew
(74) *Attorney, Agent, or Firm* — Philip H. Von Neida

(57) ABSTRACT

The invention pertains to a method for arc welding with a consumable electrode and with high deposition rates, wherein an alternating current is applied between the electrode and a work piece in order to generate the arc, wherein the alternating current has a current waveform that repeats itself after one period, and wherein the current waveform has at least one positive phase that is divided into at least one positive high-current phase and into at least one positive basic current phase and at least one negative phase within one period. According to the invention, the positive basic current phase is applied within the period after the positive high-current phase and a diffuse arc burns in the negative phase. In this case, it needs to be observed that the positive basic current phase is sufficiently long.

12 Claims, 1 Drawing Sheet
(1 of 1 Drawing Sheet(s) Filed in Color)

METHOD FOR ARC-WELDING WITH ALTERNATING CURRENT

CROSS REFERENCE TO RELATED APPLICATIONS

This application claims priority from European Patent Application Serial No. 07005696.5, filed Mar. 20, 2007, which claims priority from German Patent Application Serial No. 102007007098.7, filed Feb. 13, 2007.

BACKGROUND OF THE INVENTION

The invention pertains to a method for arc welding with a consumable electrode, wherein an alternating current is applied between the electrode and the work piece in order to generate the arc, wherein the alternating current has a current waveform that repeats itself after one period, and wherein the current waveform has at least one positive phase that is divided into at least one positive high-current phase and into at least one positive basic current phase and at least one negative phase within one period.

Different welding methods are employed in the arc welding under an inert gas atmosphere. In addition to methods with consumable electrodes which include the metal-active-gas welding and the metal-inert-gas welding methods, the tungsten-inert-gas welding method that is not carried out with a consumable electrode and the plasma welding method are also used. High-power welding methods have been increasingly utilized over the last few years in order to increase the productivity. High-power welding methods are usually carried out with consumable electrodes and are characterized by higher deposition rates than conventional metal-inert gas welding methods. The deposition rate is proportional to the wire diameter and the wire advance speed. The higher deposition rates can be converted into higher welding speeds and/or into higher welding seam volumes—in comparison with conventional welding methods. Fundamental principles of high-power metal-inert gas welding are described in greater detail in Merkblatt des deutschen Verbandes für Schweißen und verwandte Verfahren e.V., DSV 0909-1 (September 2000) and DSV 0909-2 (June 2000).

During arc welding with a consumable electrode, an arc burns between the electrode being consumed and the work piece. An electric field is applied between the electrode and the work piece in order to generate the arc. The material transfer from the electrode being consumed to the work piece takes place by detaching drops from the electrode. If the electrode has a positive polarity, the detachment of the drops is effectively promoted by the pinch effect. The pinch effect causes the constriction of the drops being created at the end of the electrode such that the detachment of drops is simplified. This improves the process stability. If the electrode has a positive polarity, the direct current or the pulsed current technique is employed. If the electrode has a negative polarity, the arc climbs up on the electrode. This results in the energy transfer over a large surface that comprises the entire region at the termination of the electrode and therefore reduces the overheating at the electrode end. When using a negative polarity of the electrode, the detachment of the drops does not take place with the assistance of the pinch effect. The lacking constriction of the drops leads to process instabilities and to splattering during the material transfer such that welding with negative polarity is very rarely used for producing welded connections. In alternating current welding, a periodic reversal of the polarity of the electrode between a positive and negative polarity takes place.

Welding with an alternating current has been used for many years and this process forms the subject of various publications. For example, DE 4023155 describes a synchronization of the wire feed and the negative polarization of the alternating current. In DE 19906039, in contrast, a maximum current level for the positive phase is defined. EP 0890407 discloses a procedure for reducing the decay time during the drop of the positive welding current. EP 1491278 discloses the utilization of helium and of doped helium in the inert gas during alternating current welding. U.S. Pat. No. 6,376,802 describes a method that prevents an interruption of the arc. To this end, a first phase with positive polarity and a current that is sufficiently high for the detachment of the drops is followed by a second phase with negative polarity, wherein the current value of the second polarity no longer suffices for the detachment of the drops, and wherein the second phase is followed by a third phase with negative polarity and a current intensity, at which a detachment of drops does not take place.

However, significant splattering occurs at higher deposition rates in the welding with consumable electrodes and an alternating current. At high deposition rates, splattering is frequently so severe that welding is no longer possible because the material to be introduced into the connection or to be applied onto the work piece splatters into all directions and does not reach the processing point. However, this problem only occurs at high deposition rates because the splattering increases proportionally to the deposition rate. Consequently, the utilization of an alternating current welding method is either impossible or results in very inferior welding connections at high deposition rates.

High energy transfers are required in high-power welding in order to achieve high deposition rates. The energy associated with a high welding current leads to the softening and the detachment of the electrode material. However, at the end of the electrode that is in contact with the arc, this leads to overheating of the electrode material such that the energy supplied to the welding process cannot be utilized for the fusion process. In addition, process instabilities occur if the electrode becomes excessively hot.

BRIEF SUMMARY OF THE INVENTION

The invention therefore is based on the objective of disclosing a method for arc welding with consumable electrodes which makes it possible to carry out the welding process in the high-power range and to achieve high deposition rates during alternating current welding.

According to the invention, this objective is attained in that the positive basic current phase is applied within the period after the positive high-current phase, and in that a diffuse arc burns in the negative phase. In this case, the positive basic current phase needs to be sufficiently long.

A high energy transfer is one basic prerequisite for high-power welding because a high deposition rate can only be achieved with a correspondingly high energy transfer. Since a high energy transfer is associated with high current values, very high current values need to be adjusted in order to achieve high deposition rates. At a high energy transfer, the electrode material becomes very soft and the electrode material detaches very well with the assistance of the pinch effect such that electrode material is very effectively consumed and the high deposition rates required for high-power welding can be realized. During a reversal of the polarity, however, the very soft electrode material leads to significant splattering such that the lower electrode end splatters into all directions and the amount of material introduced into the processing point is very insufficient. According to the invention, the positive high-current phase needs to be followed by a positive basic current phase. The energy transfer into the arc and the electrode being consumed is reduced due to the low current value, which the positive basic current phase needs to maintain for a sufficiently long time. With respect to the electrode, this means that its end once again becomes stiffer and more rigid in the basic current phase than in the high-current phase. Due to the low current intensity, the pinch effect is also comparatively weak such that hardly any constriction occurs at the electrode end. The lower electrode end therefore is in a moderately softened state prior to the reversal of the polarity into the negative phase and shows hardly any narrowing that could be caused by the constriction. This means that the electrode material hardly splatters during the reversal of the polarity. The basic current phase therefore is sufficiently long once splattering is sufficiently inhibited. In order to effectively inhibit splattering, it is advantageous that the electrode is as rigid as possible before the reversal of the polarity. The minimized splattering during the reversal of the polarity from positive to negative current achieved with the invention is required in order to realize high-quality high-power welding with an alternating current.

In order to optimize the energy transfer into the welding process and to prevent splattering in the negative phase, it is furthermore necessary that a diffuse arc burns between the electrode and the work piece in the negative phase. A diffuse arc is created during a negative polarity of the electrode and at a correspondingly low current value. Due to the negative polarity of the electrode and the low current value, the arc is not in contact with the lowermost end of the electrode, but the arc contact exclusively encompasses the termination region of the electrode, i.e., a wide area at the end of the electrode. When utilizing a wire-shaped electrode, the arc contact region encompasses a large portion of the free wire length. The value for the current is chosen so low in this case that only a diffuse arc burns and not an arc with a bright core surrounded by a corona that encompasses the termination region of the electrode. An arc with a bright core and a corona is produced at higher current values as it is also known from welding with negative electrode polarity and direct current and results in process instabilities. In a diffuse arc, a large portion of the free end of the wire electrode is heated and therefore also softened by the arc. The consumption of the electrode in the positive phase is optimally prepared due to the large-surface heating of the electrode in the diffuse arc. Consequently, it needs to be observed that the energy transfer in the negative phase is as high as possible, but only a diffuse arc can burn in the negative phase if overheating of the electrode should be effectively prevented. The utilization of a diffuse arc in the negative phase consequently ensures an effective energy transfer into the welding process and prevents the electrode from becoming excessively hot. This makes it possible to carry out high-power welding under stable conditions and high-quality welded connections can be produced.

Consequently, the inventive method ensures that the energy required for high-power welding is transferred into the welding process, namely always in the correct amount. This is the reason why the energy is supplied in the inventive method such that the energy supply suffices for optimally promoting the detachment of the electrode material and for achieving high deposition rates while simultaneously preventing process instabilities as day occur, in particular, in high-power processes due to the high energy transfer. The energy loss associated with overheating is also reduced in this case because overheating of the electrode is significantly reduced.

The inventive method makes it possible to achieve a significant increase in productivity and to substantially lower the manufacturing costs of welded structural components. The inventive advantages manifest themselves in the manufacture of all types of welded connections, as well as in build-up welding.

It is particularly advantageous that the negative phase has at least one negative high-current phase and at least one negative basic current phase, wherein the negative basic current phase is applied within the period after the negative high-current phase. The basic current phase advantageously occurs immediately before the reversal of the polarity. Due to the fact that the negative phase has at least one basic current phase and one high-current phase, a sufficient energy transfer can take place in the negative phase while still ensuring that a very low current value can be adjusted before the reversal of the polarity. The splattering that occurs during the reversal of the polarity from the negative into the positive phase is caused by the following: the formation of metallic fumes increases in the negative phase. The metallic fume current being formed generates turbulences in the arc immediately after the reversal of the polarity. This leads to splattering. This reason for splattering is significantly diminished if the current value is low in the basic current phase.

It is particularly advantageous that a material transfer due to the detachment of drops from the electrode being consumed only takes place in the positive phase. In this case, one or more drops may attach in the positive phase. A constriction of the drops takes place in the positive phase due to the pinch effect that promotes the detachment of the drops. Consequently, the material transfer takes place very effectively and specifically into the weld pool. Splattering of the electrode material during the detachment from the electrode is also prevented. The detachment of the drop(s) should advantageously take place in the first two-thirds, particularly in the first third of the time interval of the positive phase. This means that sufficient time subsequently remains for the electrode to assume a semi-pasty state before the polarity is reversed in order to thusly prevent splattering. Consequently, the advantageous inventive embodiment is characterized in a very effective material transfer into the welded connection and, in built-up welding, in a very high material build-up on the parent material—namely with little splattering.

The duration of the positive high-voltage phase advantageously amounts to 10 to 40%, preferably 20 to 30% of the duration of the positive phase. This ensures that sufficient energy is supplied to the process and the pinch effect also results in a sufficient constriction of the drops. Although advantageous in most instances, it is not necessary that the drop or the drops detach in the positive high-current phase, wherein the detachment of the drops may also take place in the positive basic current phase. However, sufficient time for preventing splattering should remain after the detachment of the drops. In order to ensure this, the positive basic current phase lasts longer than the positive high-current phase.

It is particularly advantageous that the contact point of the arc on the electrode has a length that amounts to two-times to seven-times, preferably three-times to five-times the diameter of the electrode.

Particular advantages are attained if deposition rates between 6 and 15 kg/h, preferably between 7 and 11 kg/h are used. The inventive method allows a low-heat welding process with such high deposition rates. The high deposition rates allow high welding speeds and/or a high material transfer. The electrode used preferably consists of a wire electrode with a diameter of preferably 0.8 to 1.6 mm, particularly 1.0 to 1.2 mm, because these wire diameters effectively promote high deposition rates.

In an advantageous embodiment of the invention, one or more current shoulders are inserted into one or more of the edges lying between the positive high-current phase and the positive basic current phase, between the positive basic current phase and the zero crossing and between the negative basic current phase and the zero crossing. This increases the process stability and minimizes splattering.

It may furthermore be advantageous to insert intermediate pulses in the positive and/or in the negative phase. Intermediate pulses have advantageous effects on the process stability in certain instances.

The inert gases used advantageously consist of gases or gas mixtures that contain at least argon, helium, carbon dioxide, oxygen and/or nitrogen. The specification of a suitable gas or a suitable gas mixture respectively depends on the welding task, particularly with consideration of the parent material and the filler material. Pure gases as well as two-component, three-component and multi-component mixtures may be considered for use in this case. In many instances, doped gas mixtures are particularly advantageous, wherein doped gas mixtures feature dopings with active gases in the vpm range, i.e., the doping is carried out within a range of less than one percent, usually less than 0.1 vol %. Active gases such as, for example, oxygen, carbon dioxide, nitrogen oxide, nitrous oxide or nitrogen are used as doping gases.

The inventive method is particularly suitable for instances, in which work pieces of steels or magnesium/magnesium alloys are processed. It is suitable for all steel types including structural steels, fine-grained structural steels and stainless steels. Furthermore, it may be used for other nonferrous metals such as, for example, aluminum/aluminum alloys. The inventive method also makes it possible to produce hybrid connections. Particular advantages are also attained with the inventive method when processing materials with low thermal conductivity because these materials particularly profit from the low heat transfer of the inventive method.

The inventive method broadens the options of high-power welding by opening up new applications and improving known applications. It is suitable for all types of welded connections, as well as for build-up welding. For example, the inventive method makes it possible to weld root runs and one-sided connections, particularly one-sided connections on sheets of less than 4 mm in the high-power range. The welding of such connections was, if at all, only possible to a very limited degree with the MSG-high-power welding method with an electrode with positive polarity. In many instances, an additional pool support was required which could not always be attached for geometric reasons. The inventive method is also characterized in a superior ability to bridge gaps.

The invention is described in greater detail below with reference to FIGS. 1 and 2.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION OF THE DRAWINGS

Figure 1:
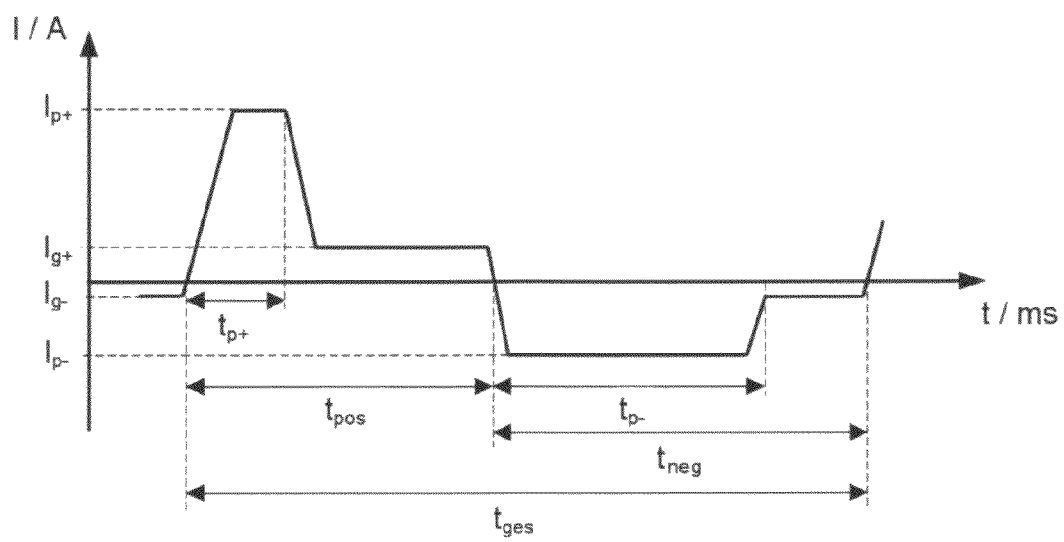
FIG. 1 shows an exemplary current waveform for the inventive method.

FIG. 1 shows an exemplary current waveform of the inventive method. In this current waveform, the current I is plotted as a function of the time t. This figure shows the waveform of the current I within one phase. The current waveform repeats itself after the time $t_{ges}$. The current rises from the negative phase, passes the zero crossing and increases to the value $I_{p+}$ of the positive high-current phase, wherein this value is maintained until the time $t_{p+}$ elapses. Subsequently, the value drops to the current of the positive basic current phase $I_{g+}$. This value is maintained until the positive phase has elapsed and the zero crossing to the phase with negative polarity takes place. Since the positive phase lasts for the time $t_{pos}$, the positive basic current $I_{g+}$ therefore is applied for the time $t_{pos}$ minus $t_{p+}$. The negative phase lasts for the time $t_{neg}$. In the negative phase, the negative current reaches the value of the negative high-current phase $I_{p-}$. The negative basic current phase $I_{g-}$ that is applied for the time $t_{neg}$ minus $t_{p-}$ follows the negative high-current phase $I_{p-}$ with the duration $t_{p-}$. Subsequently, the current increases and the zero crossing takes place. The next period begins.

With respect to the exemplary current waveform according to FIG. 1, it should also be noted that the time $t_{pos}$ and the time $t_{neg}$ are identical, but it may also be advantageous if $t_{pos}$ is longer than $t_{neg}$ or, in other instances, if $t_{neg}$ is longer than $t_{pos}$.

A current shoulder may be advantageous in order to improve the process stability. FIG. 1 does not contain a current shoulder, but the introduction of a current shoulder shall be described in greater detail with reference to FIG. 1. A current shoulder in the positive phase interrupts the drop between the positive high-current phase $I_{p+}$ and the positive basic current phase $I_{g+}$ and inserts a plateau at an intermediate level that lies between $I_{p+}$ and $I_{g+}$. A current shoulder between the positive basic current phase and the zero crossing lies between $I_{g+}$ and zero. If a current shoulder is inserted between the negative basic current phase and the reversal of the polarity, an intermediate value is inserted between $I_{g-}$ and zero. The insertion of several successive current shoulders is also possible.

Exemplary parameters for the current waveform are provided below. Frequencies between 40 and 150 Hz, particularly between 50 and 120 Hz, are preferably chosen as frequencies for the alternating current. The current intensity $I_{p+}$ of the positive high-current phase advantageously lies in excess of 450 A and the absolute current intensity value in the negative high-current phase $|I_{p-}|$ advantageously lies in the range of less than or equal to 350 A, wherein the absolute current intensity value $|I_{g-}|$ of the basic current phase is advantageously lower than 100 A.

Figure 2:
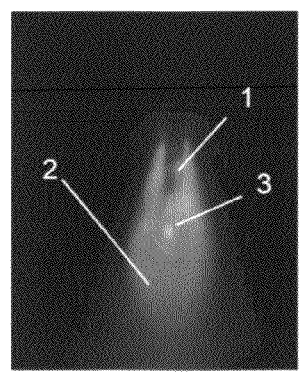
FIG. 2 shows a photograph of a diffuse arc as it is advantageously generated in the negative phase.

FIG. 2 shows the diffuse arc generated in accordance with the invention during the entire negative phase. The photograph consists of a high-speed photograph of the electrode 1, the diffuse arc 2 and a drop 3. This figure shows the electrode 1 with the detaching drop 3. The diffuse arc 2 is in contact with the termination region of the electrode. The diffuse arc consequently burns between the region at the end of the electrode 1 and the work piece.

LIST OF REFERENCE SYMBOLS $I_{p+}$ Current value in the positive high-current phase
$I_{g+}$ Current value in the positive basic current phase
$I_{g-}$ Current value in the negative basic current phase
$I_{p-}$ Current value in the negative high-current phase
$t_{p+}$ Duration of the positive high-current phase
$t_{pos}$ Duration of the positive phase
$t_{p-}$ Duration of the negative high-current phase
$t_{neg}$ Duration of the negative phase
$t_{ges}$ Duration of the entire phase
1 Electrode
2 Diffuse arc
3 Drop

I claim:

1. A method for arc welding with a consumable electrode, wherein an alternating current is applied between said consumable electrode and a work piece in order to generate an arc, wherein the alternating current has a current waveform that repeats itself after one period, and wherein the current waveform has at least one positive phase that is divided into at least one positive high-current phase and into at least one positive basic current phase and at least one negative phase within one period, characterized in that the positive basic current phase is applied within the period after the positive high-current phase and the negative phase has at least one negative high-current phase and that least one negative basic current phase, wherein the negative basic current phase is applied within the period after the negative high-current phase, and in that a diffuse arc burns in the negative phase.

2. The method according to claim 1, characterized in that a material transfer in a form of a detachment of drops from said consumable electrode being consumed only takes place in the positive phase.

3. The method according to claim 1, characterized in that a duration of the positive high-current phase amounts to 10 to 40% of the duration of the positive phase.

4. The method according to claim 1, characterized in that a duration of the positive high-current phase amounts to 20 to 30% of the duration of the positive phase.

5. The method according to claim 1, characterized in that a contact point of the diffuse arc on said consumable electrode has a length that amounts to two-times to seven-times said consumable electrode diameter.

6. The method according to claim 1, characterized in that a contact point of the diffuse arc on said consumable electrode has a length that amounts to three-times to five-times said consumable electrode diameter.

7. The method according to claim 1, characterized in that deposition rates between 6 and 15 kg/h are used.

8. The method according to claim 1, characterized in that deposition rates between 7 and 11 kg/h are used.

9. The method according to claim 1, characterized in that one or more current shoulders are inserted into one or more edges lying between the positive high-current phase and the positive basic current phase, between the positive basic current phase and a zero crossing and between the negative basic current phase and said zero crossing.

10. The method according to claim 1, characterized in that intermediate pulses are inserted into the positive and/or into the negative phase.

11. The method according to claim 1, characterized in that an inert gas is selected from the group consisting of gases or gas mixtures selected from the group consisting of argon, helium, carbon dioxide, oxygen and nitrogen.

12. The method according to claim 1, characterized in that work pieces of steels or magnesium/magnesium alloys are processed.

* * * * *